(12) United States Patent
Cunningham

(10) Patent No.: US 6,329,905 B1
(45) Date of Patent: Dec. 11, 2001

(54) POWER LINE COMMUNICATION SYSTEM AND METHOD

(75) Inventor: Glen Cunningham, Rockport, MA (US)

(73) Assignee: Thalia Products, Inc., Boca Raton, FL (US)

( * ) Notice: Subject to any disclaimer, the term of this patent is extended or adjusted under 35 U.S.C. 154(b) by 0 days.

(21) Appl. No.: 09/534,914

(22) Filed: Mar. 23, 2000

(51) Int. Cl.$^7$ ................................................. H04M 11/04
(52) U.S. Cl. ............................. 340/310.01; 340/310.02
(58) Field of Search ....................... 340/310.01, 310.02, 340/310.03, 531; 375/346, 316, 317

(56) References Cited

U.S. PATENT DOCUMENTS

| | | | |
|---|---|---|---|
| 5,185,591 | 2/1993 | Shuey | 340/310 A |
| 5,777,544 | 7/1998 | Vander Mey et al. | 340/310.01 |
| 5,844,949 | 12/1998 | Hershey et al. | 340/310.01 |
| 6,101,214 * | 8/2000 | Hershey et al. | 340/310.02 |
| 6,104,707 * | 8/2000 | Abraham | 340/310.01 |
| 6,115,429 * | 9/2000 | Huang | 340/310.01 |

* cited by examiner

Primary Examiner—John A. Tweel
(74) Attorney, Agent, or Firm—Kramer Levin Naftalis & Frankel LLP

(57) ABSTRACT

A system for communicating digital information over wires having a great deal of harmonic distortion, attenuation and noise, such as a power line, employs a transmitter which generates a signal representing a symbol of data. Some form of signal modulation such as Differential Phase Shift Keying (DPSK) or Frequency Shift Keying (FSK) is used to encode the data. The transmitter will continuously transmit or retransmit each data symbol until an acknowledgment is received from a receiving device. At the receiving device, the received signal is sampled and multiple repetitions of the same symbol are averaged to reduce noise. The averaged samples are then analyzed to demodulate the data. Both transmitting and receiving devices are clocked at the same frequency which is derived in both from the fundamental power line frequency. As such, the generation and detection of the data signals is coherent, making it possible to average out the effect of noise over multiple frames thereby ensuring communication even over highly noisy transmission media.

10 Claims, 10 Drawing Sheets

POWER LINE COMMUNICATION SYSTEM AND METHOD

FIELD OF THE INVENTION

The present invention relates to communications, particularly data communications systems and methods over power lines.

BACKGROUND INFORMATION

There are a variety of known applications where it is necessary or desirable to communicate data over power lines. For example, electric power meters for measuring power consumption in a building can advantageously be read remotely over the same power lines to which they are coupled. (See, e.g., U.S. Pat. No. 5,844,949). In another application, appliances within a household, such as a light switch or dimmer, can be controlled by signalling placed on the household power lines.

Conventional power lines, however, typically present a high-distortion, high-noise environment in which reliable and fast data communication is often not possible. In addition to additive white Gaussian noise (AWGN), power lines exhibit noise that is synchronous with the line frequency (e.g., lamp dimmer noise), periodic noise (e.g., motor-generated noise), random noise, radio frequency (RF) noise and interference from other communications devices such as intercoms and security systems. In addition to noise, data signals may also experience substantial attenuation such as when traveling through a transformer from one phase to another. Moreover, notch filters or other frequency-selective attenuation may be coupled to the power lines such as in power supplies for personal computers or power strips.

An additional problem involves voltage transformers, which are inherently inductively coupled and thereby introduce non-linear phase shifts in a signal passing through the transformer. This can lead to substantial signal distortion.

Furthermore, much of the noise on typical household power lines is located at harmonics of the AC line frequency (i.e., 50 or 60 Hz) that extend over large frequency ranges. As such, data communication over virtually any band of frequencies wider than the line frequency will be susceptible to such harmonic noise.

Known power line communications protocols (e.g., X-10, CEBus) often do not provide reliable operation to all outlets in a typical home. Moreover, such known techniques often require costly bridging devices to allow devices coupled to circuits on different phases to communicate with each other.

Complex communications systems are required to perform reliably in the high-noise, phase-distorted power line environment. For example, some of these systems monitor different frequency channels, select an appropriate channel, and then indicate the appropriate frequency to other communicating units. Some systems employ a plurality of signals which are not harmonically related. This requires complicated filtering and signal extraction. (See, e.g., U.S. Pat. No. 5,185,591.) Another scheme, Geometric Harmonic Modulation (GHM) allocates signaling energy into lobes, or tones, at different frequencies being evenly spaced at geometrically increasing multiples of a base frequency. The GHM signaling waveforms are spread spectrum signals in that the signal bandwidth, the bandwidth from the lowest frequency tone to the highest, vastly exceeds the information bandwidth conveyed by the GHM transmission.

Such solutions, however, can be costly to implement and may not ensure fool proof operation, thus rendering them inappropriate for applications where both cost and reliability are motivating considerations such as in household appliance control and communications.

There thus exists a need for a communication system which can reliably yet cost-effectively provide data communications over power lines even under the most adverse conditions.

SUMMARY OF THE INVENTION

The present invention provides a system and method for reliably communicating data over a channel, such as power lines, which channel is characterized by a great deal of harmonic interference, noise and distortion.

An exemplary embodiment of a transmitting device in accordance with the present invention comprises a signal synthesis device which generates a multi-tone signal having a plurality of frequency lobes selected to be positioned away from interference commonly found on power lines. The transmitted signal is generated in accordance with a sample clock signal derived from the line frequency (e.g., 50 or 60 Hz) and thus has a fixed relation thereto. In a preferred embodiment, a modulation device generates first and second tones from prestored waveform samples. The relative phase between the two tones is varied in accordance with the data to be transmitted. The two tones are summed, converted to analog form and applied to the power line for transmission.

The present invention further provides a receiving device for decoding signals generated by the transmitting device. The receiving device comprises a sample clock signal generator which, like the transmitting device, generates a sample clock signal from the line frequency. The modulated signal received from the transmitting sub-system is sampled at the clock frequency by an analog-to-digital converter to digital form and then passed to some form of signal analysis such as a discrete Fourier transform (DFT) device, preferably implemented with a fast Fourier transform (FFT) structure. The DFT device generates the frequency-domain components of the received signals which are then analyzed to extract the base band data encoded in the received signals.

In a preferred embodiment, each symbol of data (e.g., each bit) that is continuously transmitted by the transmitting sub-system until the transmitting sub-system receives from the receiving sub-system an acknowledgment that the symbol of data has been received. Because of the coherency of the receiving and transmitting sub-systems, the receiving sub-system will always properly decode the received signal, given enough samples. This is true even in conditions where the noise power equals or exceeds the signal power.

DETAILED DESCRIPTION

Figure 1:
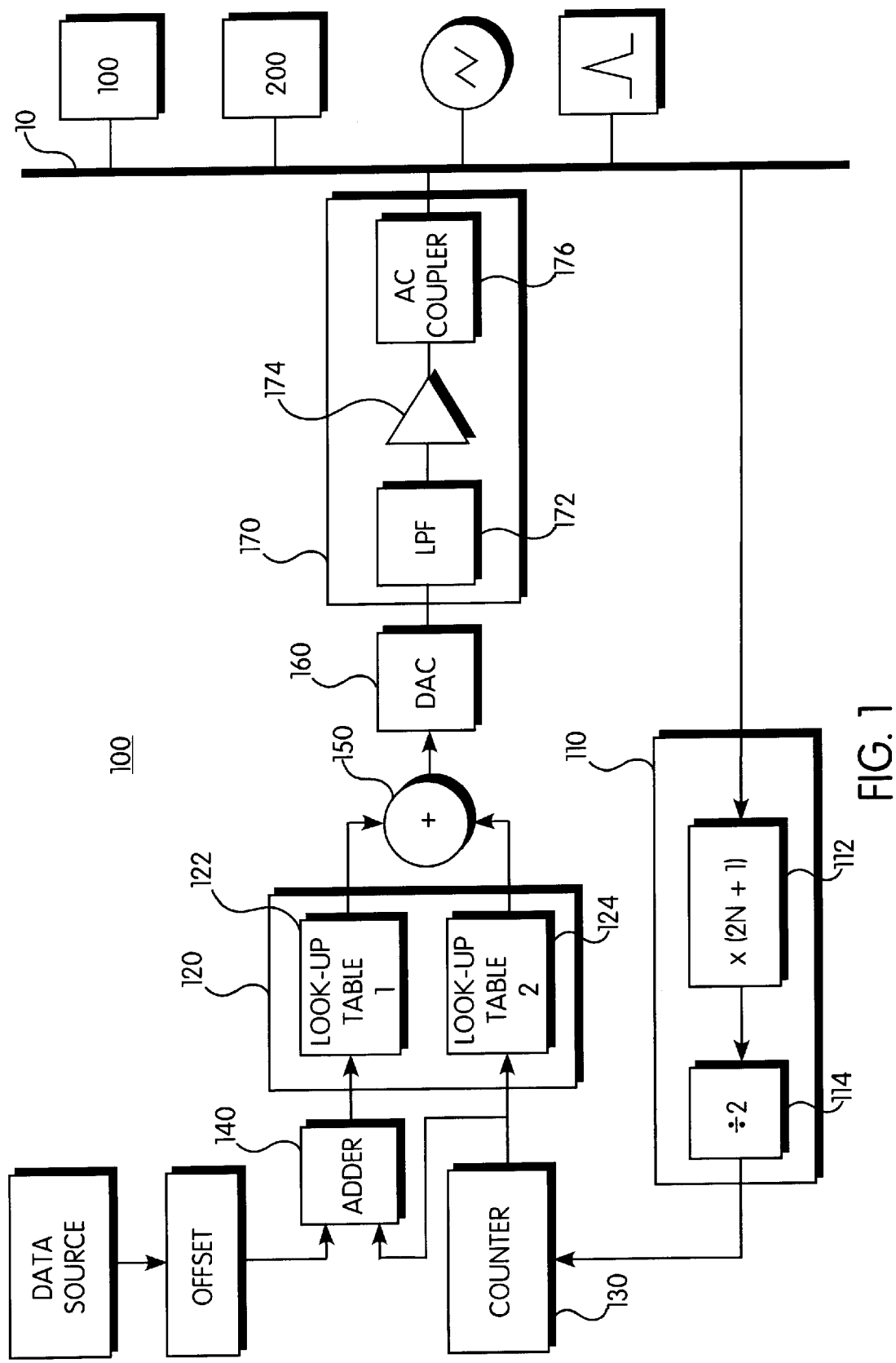
FIG. 1 is a block diagram of an exemplary embodiment of a data transmitting device in accordance with the present invention.

FIG. 1 is a block diagram of an exemplary embodiment of a data transmitting device 100 in accordance with the present invention. As shown in FIG. 1, the data transmitting device 100 is coupled to a power line 10 to which other transmitting devices, receiving devices and sources of noise may be coupled.

The transmitting device 100 comprises a clock generating circuit 110 for generating a clock signal from the fundamental AC power line frequency (e.g., 50, 60 Hz) on the power line 10. The clock circuit 110 determines master timing information from the fundamental power line frequency, for example by detecting zero-crossings. In the exemplary embodiment shown, the clock circuit 110 comprises a frequency multiplier 112 and frequency divider 114. The frequency multiplier 112 multiplies the line frequency by an odd number (i.e., 2N+1) while the frequency divider 114 divides the frequency by 2. This arrangement ensures that the resultant frequency falls between harmonics of the line frequency. For example, given a line frequency of 60 Hz and a value of N =2000, the frequency of the clock signal generated by the timing circuit 110 will be 120,030 Hz, which falls evenly between the 2000th (120,000 Hz) and 2001st (120,060 Hz) harmonics of 60 Hz. This choice of frequencies may improve the signal quality by reducing the noise at the carrier frequencies, but it is not a required element of this invention. Furthermore, because the relationship between the clock frequency and the line frequency is fixed, the system of the present invention is not susceptible to the drift and frequency variations as may occur if the clock were generated by a crystal oscillator or the like.

In the exemplary embodiment shown, two tones are generated for each symbol (or baud) of data transmitted and each symbol consists of one bit. Each data symbol is represented by the summation of the two tones over the duration of that symbol. The duration of each symbol may also be referred to as a frame. Each of the two tones is a sinusoid that repeats an integral number of cycles in each frame and is continuous from one frame to the next.

In a preferred embodiment of the present invention, the transmitting device 100 will continuously transmit the same symbol until it receives an indication from a receiving device that the symbol has been received. Once the transmitting device 100 receives such an indication, it will begin transmitting frames containing the next symbol of data.

The exemplary transmitting device 100 comprises a storage device 120 for storing waveform samples of each of the two tones. The storage device 120 may comprise two storage blocks or tables 122, 124 of preferably contiguous storage spaces into which the waveform samples for each tone are sequentially stored.

The waveform samples for each tone are retrieved sequentially from the respective tables 122 and 124 using an address pointer for each tone. The waveform address pointer for the first tone is generated by a counter 130 which is clocked by the clock signal (e.g., 120,030 Hz). The address pointer for the second tone is generated by an adder 140 which adds an offset to the address pointer of the first tone to generate the address pointer for the second tone. The offset that is added is a function of the baseband data that is to be transmitted and is updated with each new symbol of data. Thus, for example, if each symbol represents one bit of data, the offset will be decremented by a first predetermined value (e.g., −2) when the data bit is a logical "0" and incremented by a second predetermined value (e.g., +2) when the data bit is a logical "1". The offset in the retrieval of waveform samples corresponds to a phase difference between the two tones. This example of a transmitting device of the present invention thus implements differential phase shift keying (DPSK). The offset will remain the same for each symbol, even if multiple frames of that symbol are transmitted. So that the receiving device can detect the transmission of a new symbol, the exemplary transmitting device 100 of the present invention ensures that a phase shift will occur with each new symbol. Thus for example, for a data bit sequence of 01001110 the relative offset will change by increments of −2, +2, −2, −2, +2, +2, +2, −2. Assuming a starting phase difference of 0, the absolute phase difference between the two will thus be −2, 0, −2, −4, −2, 0, +2, 0. The signal analysis of the receiver will detect the change in phase between symbols to determine when a new symbol occurs and whether it is encoding a zero or a one bit.

The waveform sample values retrieved for each tone at each interval of time are summed together 150 and provided to a digital-to-analog converter (DAC) 160. The analog output of the DAC 160 is coupled to a signal conditioning circuit 170 which includes a low pass filter (LPF) 172, followed by an amplifier or driver 174 and an AC coupler 176 for coupling the output of the transmitting device 100 to the power line 10. The component blocks of the signal conditioning circuit 170 can be implemented in a variety of known ways.

In an exemplary embodiment, 32 waveform samples are stored in each of the tables 122 and 124. The counter 130 is a modulo-32 counter that generates a 5-bit pointer. The adder 140 is a modulo-32 adder.

Figure 2A:
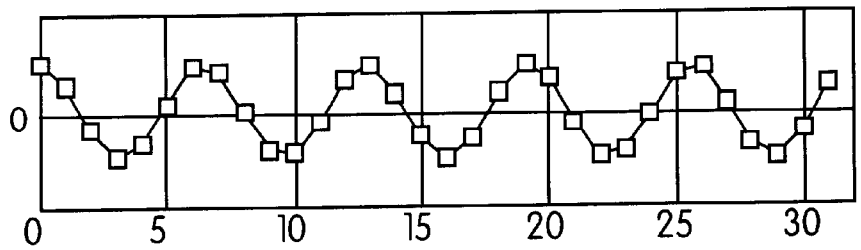
FIGS. 2A through 2E show exemplary waveforms generated by an exemplary data transmitting device of the present invention.
Figure 2B:
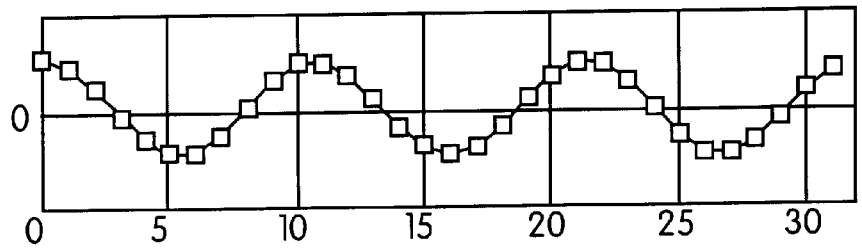
Figure 2C:
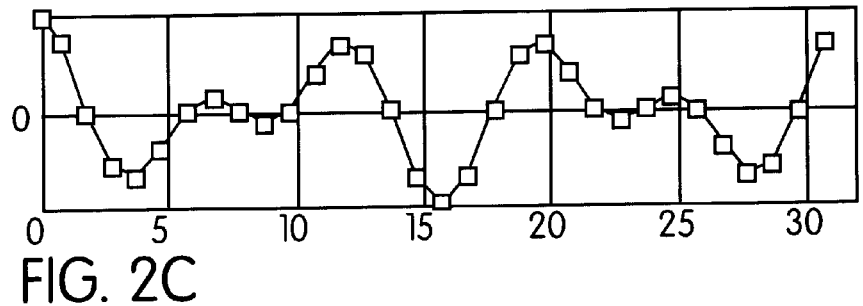
Figure 2D:
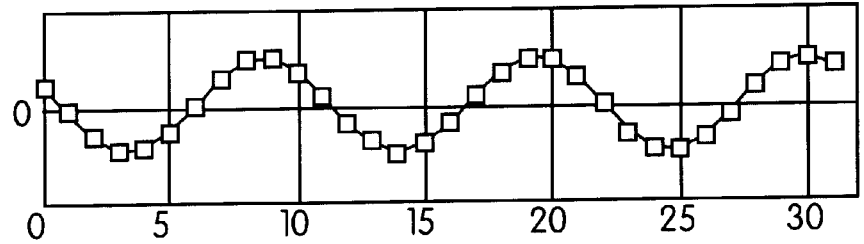
Figure 2E:
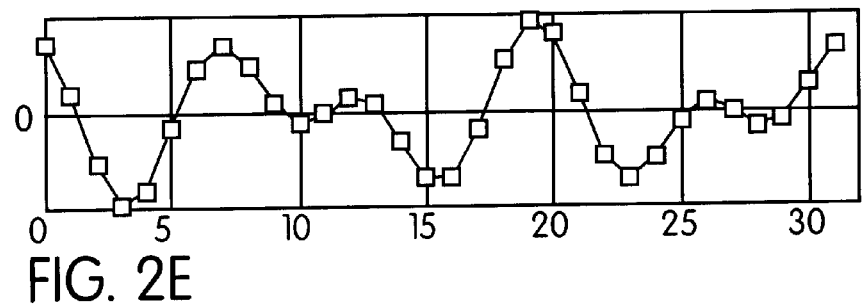

FIGS. 2A and 2B show exemplary waveforms and sample points for two tones that may be used in the present invention. The first tone (FIG. 2A) repeats five times in the 32-sample frame whereas the second tone (FIG. 2B) repeats three times. FIG. 2C shows the combined waveform and sample points which result from the summation of the two tones. As described above, data is encoded by shifting the phase of the two component waveforms or "tones" in time and/or relative to each other. For example, FIG. 2D shows the second tone shifted ahead in time (to the left) by two samples relative to the first tone. The combination of the first tone and the shifted second tone is shown in FIG. 2E.

The frequency multiplier 112 can be implemented in a known way with a phase-locked loop (PLL) and a 2N+1 divider in the feedback loop of the PLL. The divider, counter 130, adder 140, storage 120, summing point 150 and DAC 160 can also be implemented in a variety of known ways using conventional discrete or integrated components. The feedback divider in the frequency multiplier is preferably programmable. As such, if a substantial amount of noise is detected to reside at the generated tone frequencies, the multiplier can be re-configured (e.g. a microcontroller can load a new divisor 2N+1 into the feedback divider) to generate a new sample clock frequency so that the generated tones avoid the noise.

Likewise, by programming different communications devices with different divisors, 2N+1, different communications channels can be established over the same transmission medium thereby allowing simultaneous communications among different sets of devices over the same power lines. This is particularly useful, for example, where different homes share common power lines and it is desirable to prevent devices from communicating with other devices in other homes while allowing those devices to communicate with other devices within the same home. In such an application, the divisor, 2N+1, can be derived, for example, from an identifying code which is unique to each household. This frequency channel scheme may be used in conjunction with or in addition to house codes embedded in the data stream.

Figure 3:
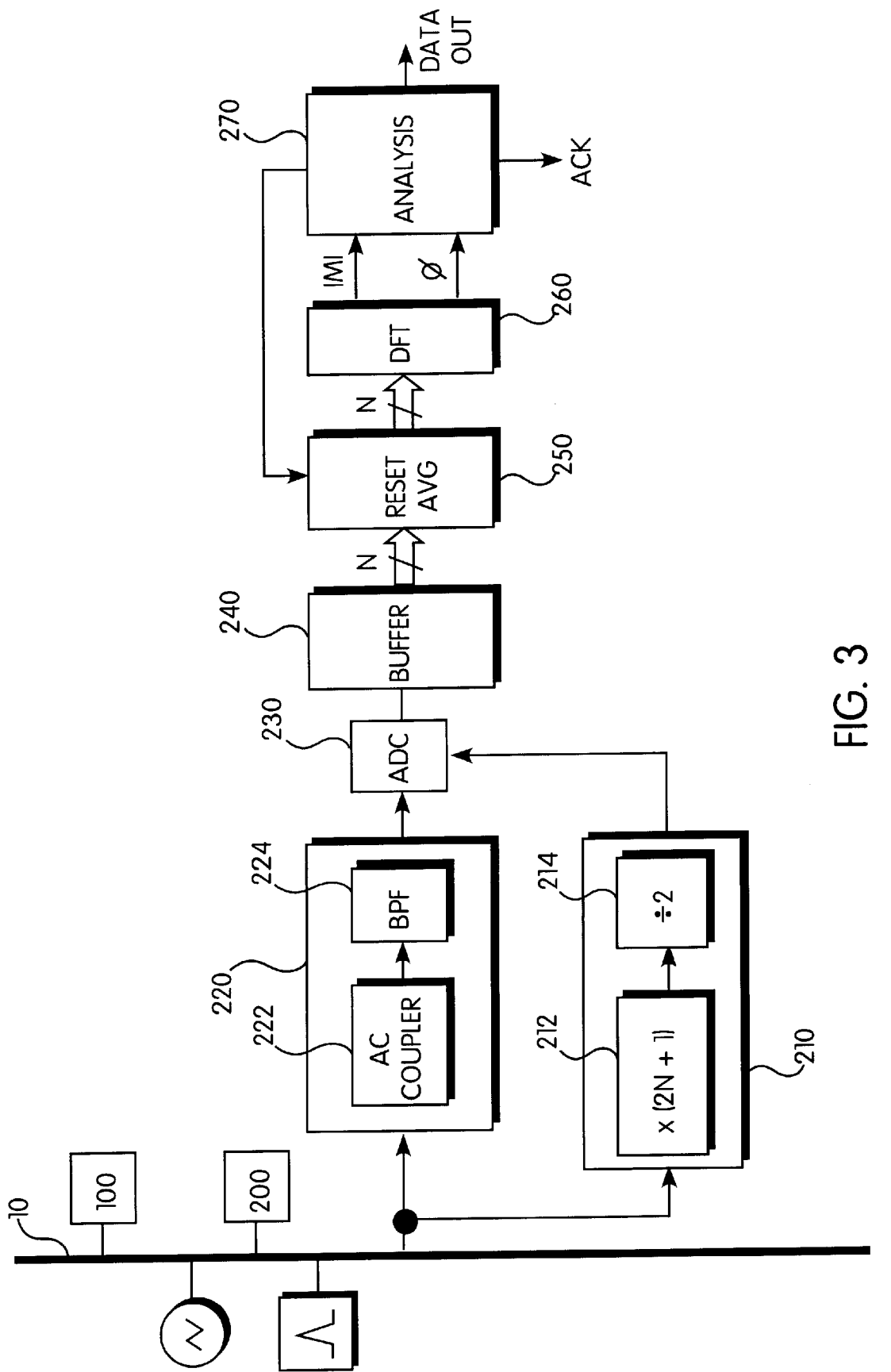
FIG. 3 is a block diagram of an exemplary embodiment of a data receiving device in accordance with the present invention.

FIG. 3 is a block diagram of an exemplary embodiment of a data receiving device 200 in accordance with the present invention. As shown in FIG. 3, the data receiving device 200 is coupled to a power line 10 to which transmitting devices such as the exemplary transmitting device 100 described above, other receiving devices and sources of noise may be coupled. The exemplary receiving device 200 described is adapted to receive signals transmitted by the exemplary transmitting device 100 described above.

The receiving device 200 comprises a clock generating circuit 210 for generating a clock signal from the AC line frequency (e.g., 50, 60 Hz) on the power line 10. The clock circuit 210 of the receiving device 200 is similar to the clock circuit 110 of the transmitting device 100 and is configured to generate the same clock frequency as that of the transmitting device (e.g., 120,030 Hz, with N =2000.) With both the transmitting and receiving devices using similar clock signals derived from the same source, namely the power line, coherence between the two is ensured; i.e., the receiver is clocking in data at the same rate that the transmitter is clocking the data out.

The receiving device 200 further includes a signal conditioning circuit 220 which is coupled to the power line 10. The circuit 220, which comprises an AC coupler 222 and a band-pass filter (BPF) 224, serves to couple the signals on the power line 10 and to attenuate noise and other interference over the frequency range of interest. These functions can be- implemented in a variety of known ways. The output of the signal conditioning circuit 220 is coupled to an analog-to-digital converter (ADC) 230 which is clocked by the clock signal to sample and digitize the received signal.

The digital samples generated by the ADC 230 are provided to a buffer 240 which buffers-up a frame's worth (e.g., 32) of samples. The buffer 240 can be implemented as a block of storage spaces which are filled in sequence with successive samples of the received signal. Once a frame of samples have been buffered-up by the buffer 240, the samples are provided, in parallel, to an averaging block 250. For each of the time slots in a frame (e.g., 32 slots/frame), the averaging block 250 generates a running average of the values of that time slot over successive frames, until detection occurs (as described below). Thus for example, after a frame representing a given data symbol has been transmitted k times, each of the n outputs $y_n$ of the averaging block 250 will generate:

$$y_n = 1/k(s_{n,0} + s_{n,1} + \ldots + s_{n,k-1})$$

where $s_{n,i}$ are the series of successive samples received for the time slot n. Once the contents of the frame have been detected and a new frame of data is received, the averaging block 250 is reset and begins generating new running averages for each time slot. The averaging block 250 can be implemented in a variety of known ways. By ensuring coherence between the receiver and transmitter, as discussed above, the averaging block 250, given a sufficient number of frames, can average-out the noise, which is random, to the point where an identification of the embedded information-carrying tones becomes apparent.

The averaging block 250 provides the running averages for the time slots of each frame to a discrete Fourier transform (DFT) block 260 which operates on the averaged sample values.

The DFT 260 performs a Fourier transformation on the averaged sample values received in order to generate a frequency domain representation of the received signal. For simplicity of implementation and speed of operation, the DFT 260 is preferably comprised using a Fast Fourier Transform (FFT) structure.

The DFT 260 can generate either the polar (magnitude and phase) or quadrature (real and imaginary) components of the transformed signal. This output can then be analyzed by an analysis block 270 to determine the data that is received in each frame. It should be pointed out that unlike other systems, no windowing function is required for the DFT in the receiving device of the present invention. Because integral numbers of cycles of each tone are used and the receiving and transmitting devices are coherently clocked there are no discontinuities in the input signal to the DFT and thus there is no need for a windowing function to taper such discontinuities. This substantially reduces the number and complexity of calculations that otherwise would be required.

In an exemplary embodiment, the analysis block 270 may use several criteria to determine that a frame of data has been properly received and its value. First, the magnitude output of the FFT 260 must show peaks at the frequencies of the two tones. These peaks must be some predetermined magnitude larger than the surrounding noise (e.g., 10 dB). Additionally, the analysis block 270 will look at the phase output of the FFT 260. The phase response must be stable and within a reasonable range of expected values such as being +2 or −2 samples phase shift from the previous symbol.

For each symbol of data, once the analysis block 270 makes a determination of the data received, it generates an acknowledgment message which is communicated back to the transmitting device via a reverse channel. The acknowledgment message can consist of the received data, thus echoing the data. The transmitting device 100 of the present invention will retransmit a frame of data until it receives the acknowledgement message from the receiving device 200 indicating receipt of the symbol by the receiving device. As such, the present invention provides a system and method of data communication in which the data rate is self-adjusting, baud-by-baud (or symbol-by-symbol), depending on the noise conditions encountered on the transmission medium.

The operation of the system of the present invention will now be described further with reference to FIGS. 4A through 4D.

Figure 4A:
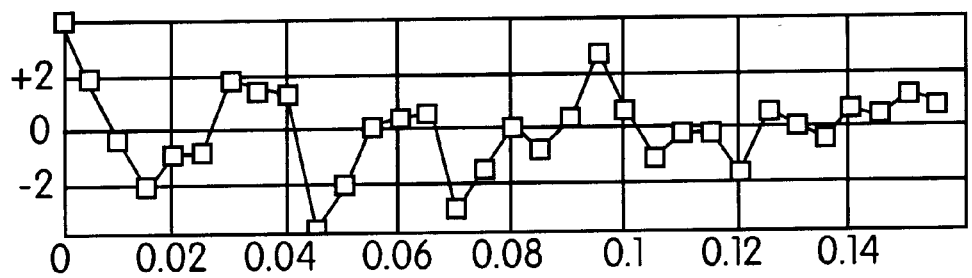
FIGS. 4A through 4D show exemplary waveforms received and processed by an exemplary data receiving device of the present invention.
Figure 4B:
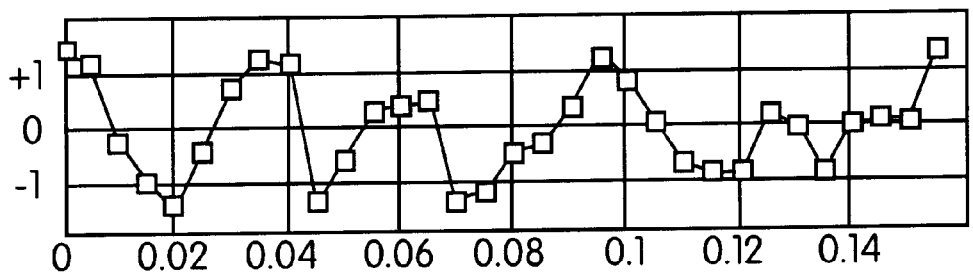
Figure 4C:
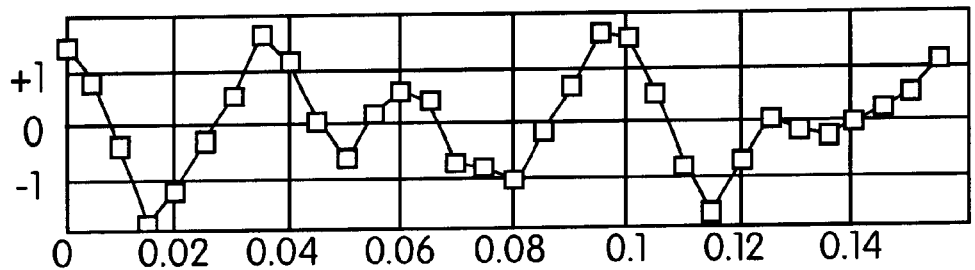
Figure 4D:
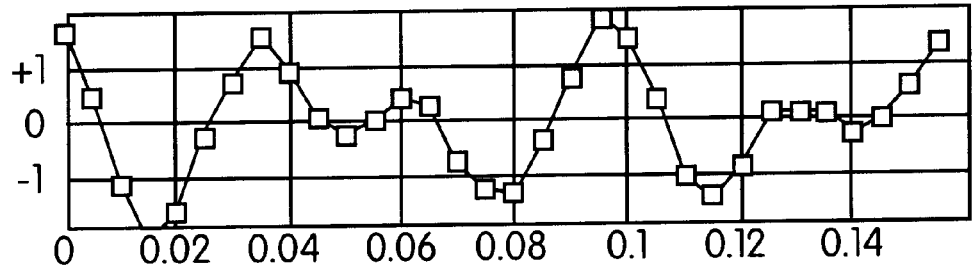
Figure 5A:
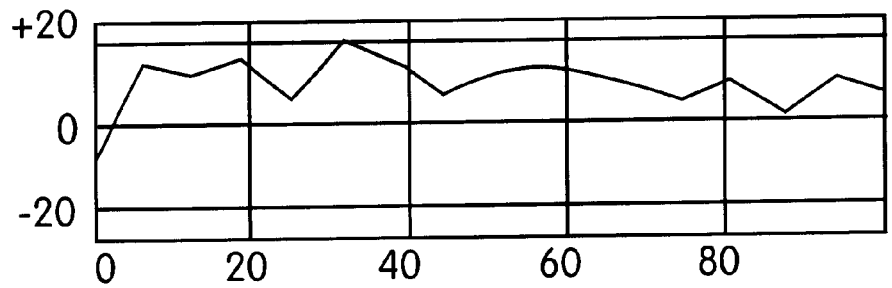
FIGS. 5A through 5D show exemplary spectral components of signals received and processed by an exemplary data receiving device of the present invention.
Figure 5B:
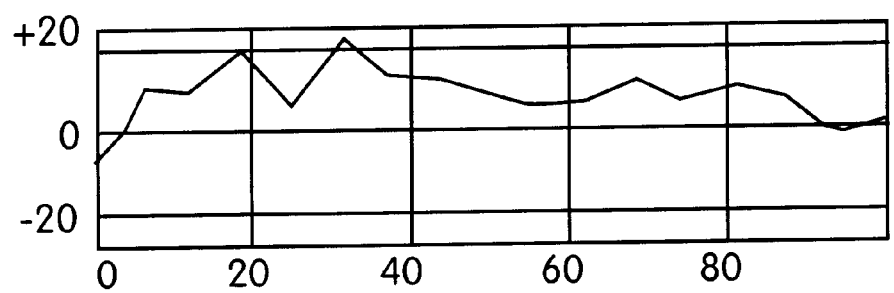
Figure 5C:
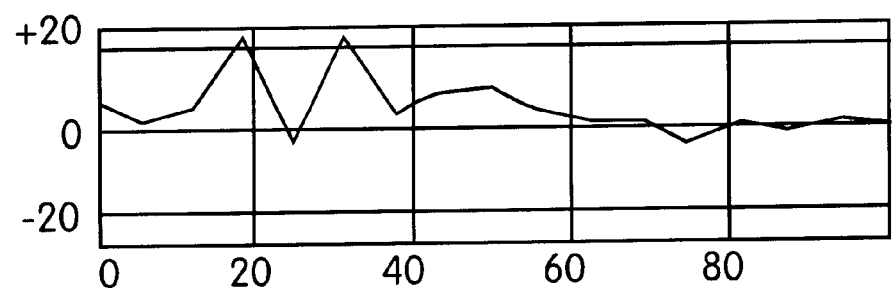
Figure 5D:
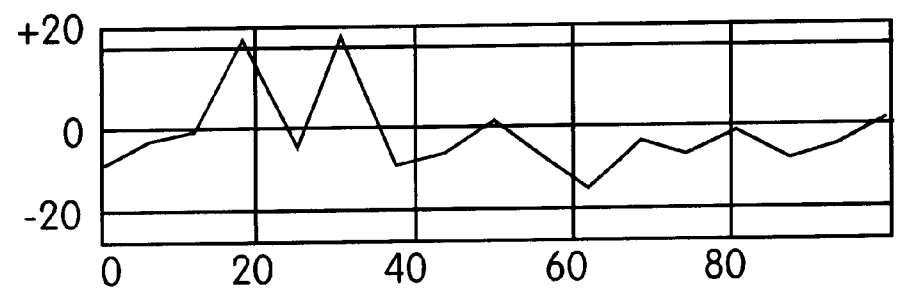

FIG. 4A shows the signal of FIG. 2E as it might appear on a power line having a signal-to-noise ratio of approximately 0 dB (i.e., the noise power is substantially equal to the signal power). In accordance with the present invention, however, by matching the frame sample rate of the receiver with the sample rate of the transmitter, and by averaging together successive frames (as done by the averaging block 250 in the receiver), the effect of the noise can be reduced, effectively increasing the signal-to-noise ratio over time. FIGS. 4B, 4C and 4D show a running average of the frames after 2, 10 and 100 frames, respectively (as generated at the outputs of the averaging block 250). Comparing FIG. 4D with FIG. 2E shows how the effect of the noise introduced by the line has been virtually eliminated. As described above, the averaged signal is then provided to the DFT 260 for transformation to the frequency domain.

The improvement in the signal-to-noise ratio can also be seen in the frequency domain. FIGS. 5A through 5D show the Fourier Transform analysis of the mean of N frames for N=1, 2, 10 and 100, respectively. As shown in this sequence of figures, the two tones create spectral peaks that are more and more apparent as the signal floor drops due to the coherent averaging of frames.

Figure 6A:
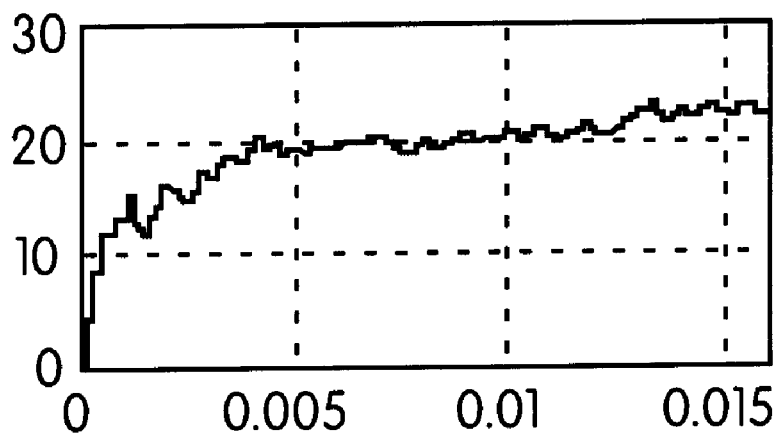
FIGS. 6A and 6B show the amplitude and phase, respectively, of received signals, as processed by an exemplary data receiving device of the present invention.
Figure 6B:
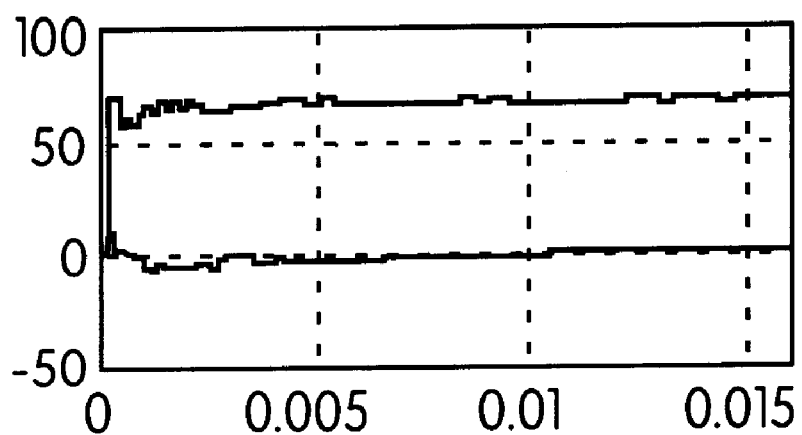

FIG. 6A shows the difference (in dB) between the power level of the expected tonal peaks and the highest noise peaks over time. This is one measure of the quality of the signal detection and the effective signal-to-noise ratio improvement due to the coherent frame processing. As shown in FIG. 6A, the quality steadily improves with time. Furthermore, since data is encoded by shifting the phase of one or both of the tones, another measure of interest are the phases of the two expected tones in the received signal and how quickly they stabilize. FIG. 6B shows the phases of the two tones over time. As shown, the phase values stabilize quite quickly, even in this case where the noise power substantially equals the signal power.

Figure 7A:
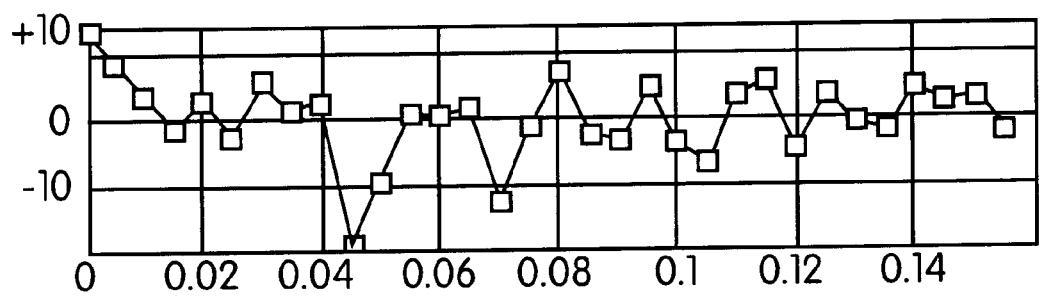
FIGS. 7A through 7D show exemplary waveforms received and processed by an exemplary data receiving device of the present invention in a high noise environment.
Figure 7B:
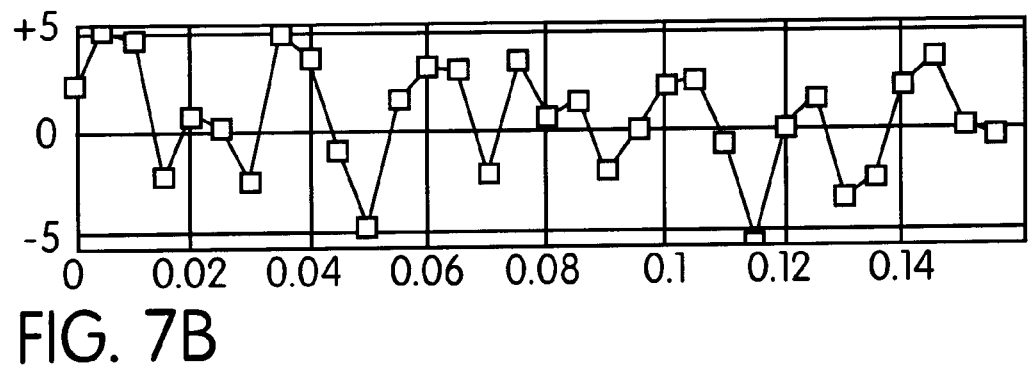
Figure 7C:
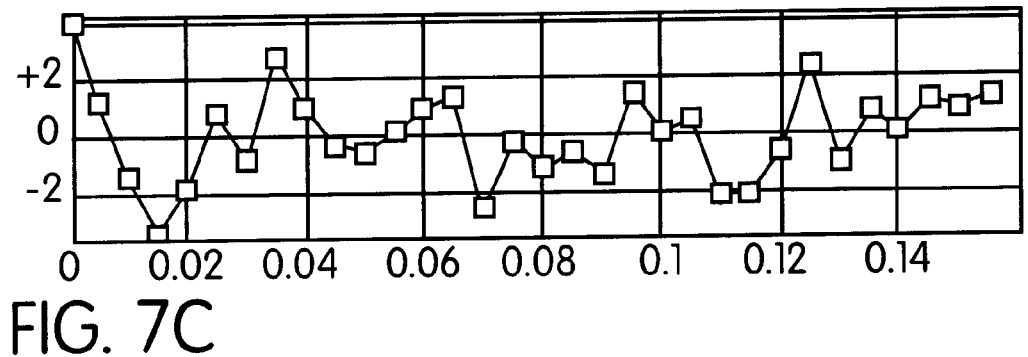
Figure 7D:
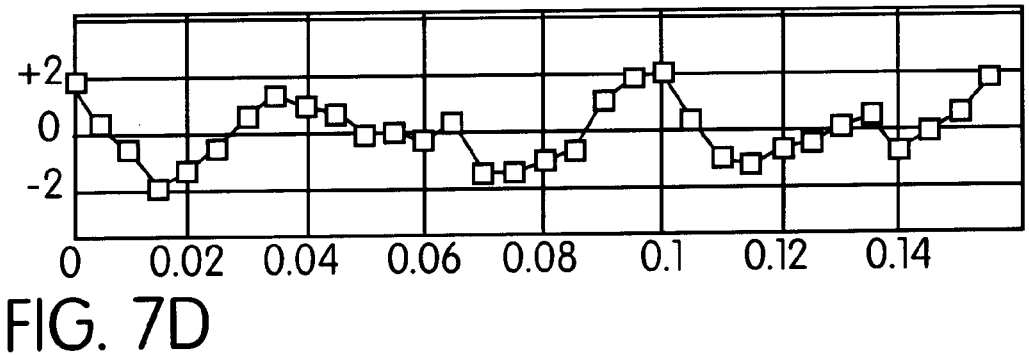
Figure 8A:
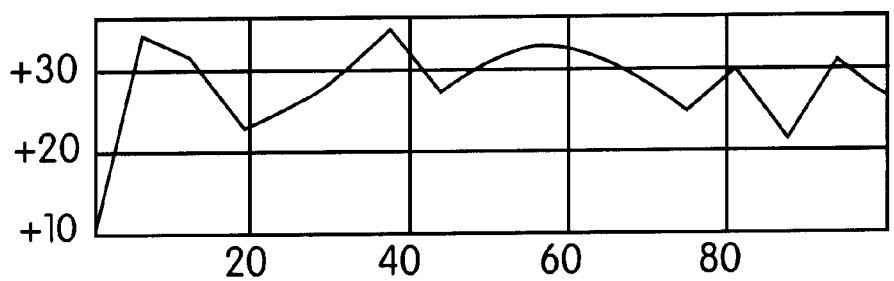
FIGS. 8A through 8D show exemplary spectral components of signals received and processed by an exemplary data receiving device of the present invention in a high noise environment.
Figure 8B:
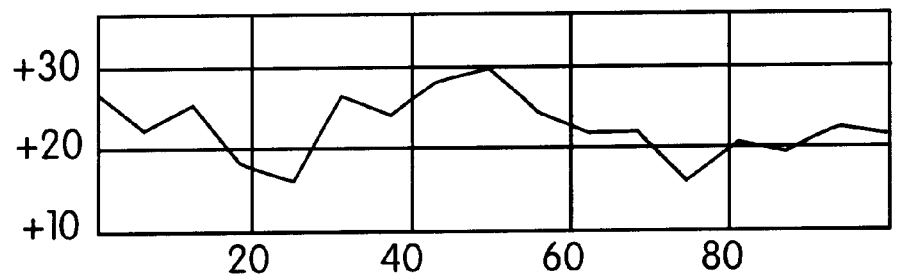
Figure 8C:
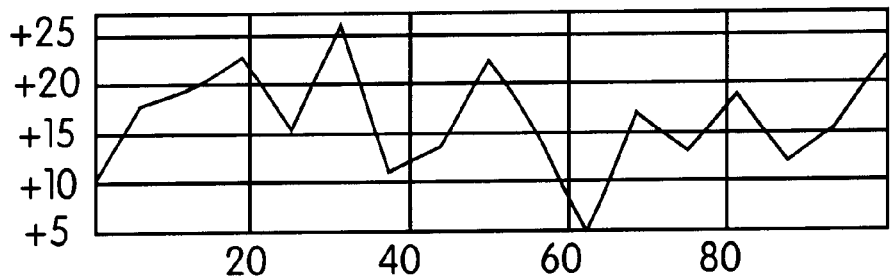
Figure 8D:
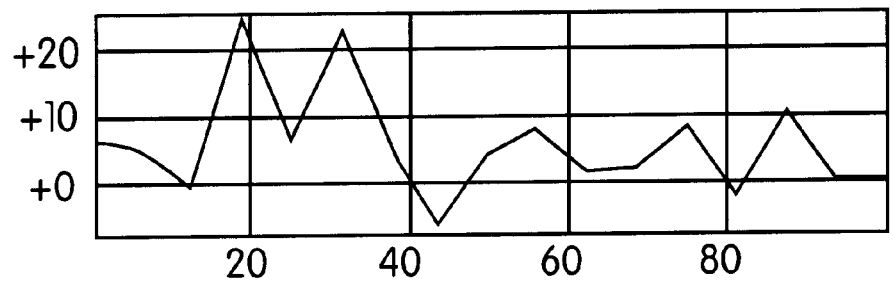

FIG. 7A shows the signal of FIG. 2E as it would appear on a power line having a signal-to-noise ratio of −20 dB (i.e., the noise power is 100 times higher than the signal power). A high noise level, a significant attenuation of the transmitted signal, or some combination of the two may cause this condition. Such signal attenuation can occur, for example, between different phases of a household power system, thereby preventing conventional communications devices from operating properly without some bridging device. The system of the present invention, however, is capable of operating under such low signal-to-noise conditions without additional bridging devices. FIGS. 7B, 7C and 7D show a running average of the frames after 10, 100 and 1000 frames, respectively (as generated at the outputs of the averaging block 250). The extremely poor signal to noise ratio requires that a higher number of frames be averaged before the expected signal starts to become apparent. FIGS. 8A through 8D illustrate the respective frequency domain representations of the improving signal-to-noise ratio achieved with the present invention. As shown in FIGS. 8A through 8D, the two tones become increasingly apparent as the signal floor drops due to the coherent averaging of frames, in accordance with the present invention.

Figure 9A:
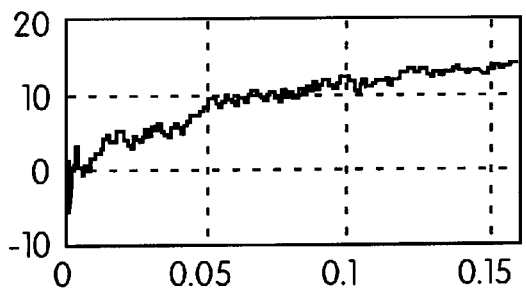
FIGS. 9A and 9B show the amplitude and phase, respectively, of received signals in a high noise condition, as processed by an exemplary data receiving device of the present invention.
Figure 9B:
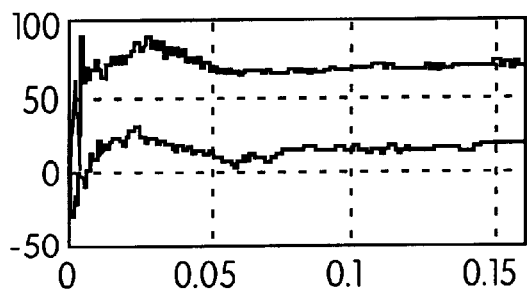

For the −20dB signal-to-noise condition, FIG. 9A shows the difference (in dB) between the power level of the expected tonal peaks and the highest noise peaks over time whereas FIG. 9B shows the phases of the two tones over time. As shown in these figures, the signal-to-noise quality improves and the phase values stabilize with time, although more slowly than under better signal-to-noise conditions (compare to FIGS. 6A and 6B).

Figure 10A:
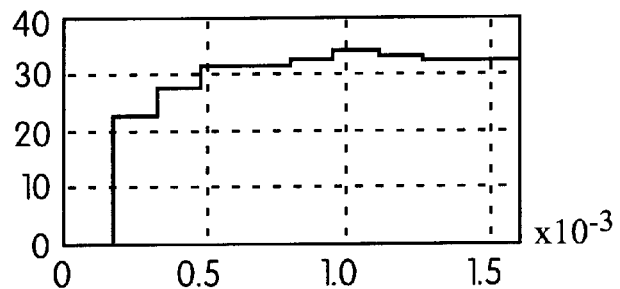
FIGS. 10A and 10B show the amplitude and phase, respectively, of received signals in a low noise condition, as processed by an exemplary data receiving device of the present invention.
Figure 10B:
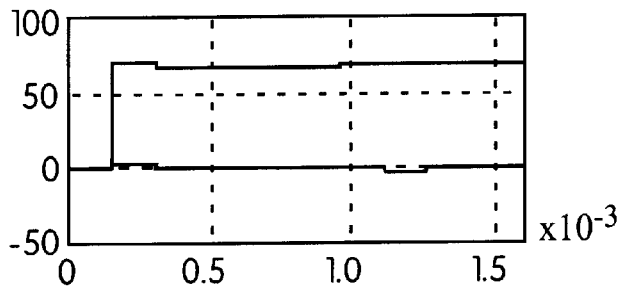

As a further comparison, FIGS. 10A and 10B show the signal quality and phase plots for a much more favorable signal to noise ratio of +20dB (i.e., the signal to noise power ratio is thus 10,000 times better than the −20dB example.) As expected, the signal quality is much better sooner, enabling a higher effective bit rate. In fact, both the signal to noise ratio and the phase plots show that a determination of the bit encoding is possible after a single frame. (The plots show a time duration of ten frame periods.)

Figure 11:
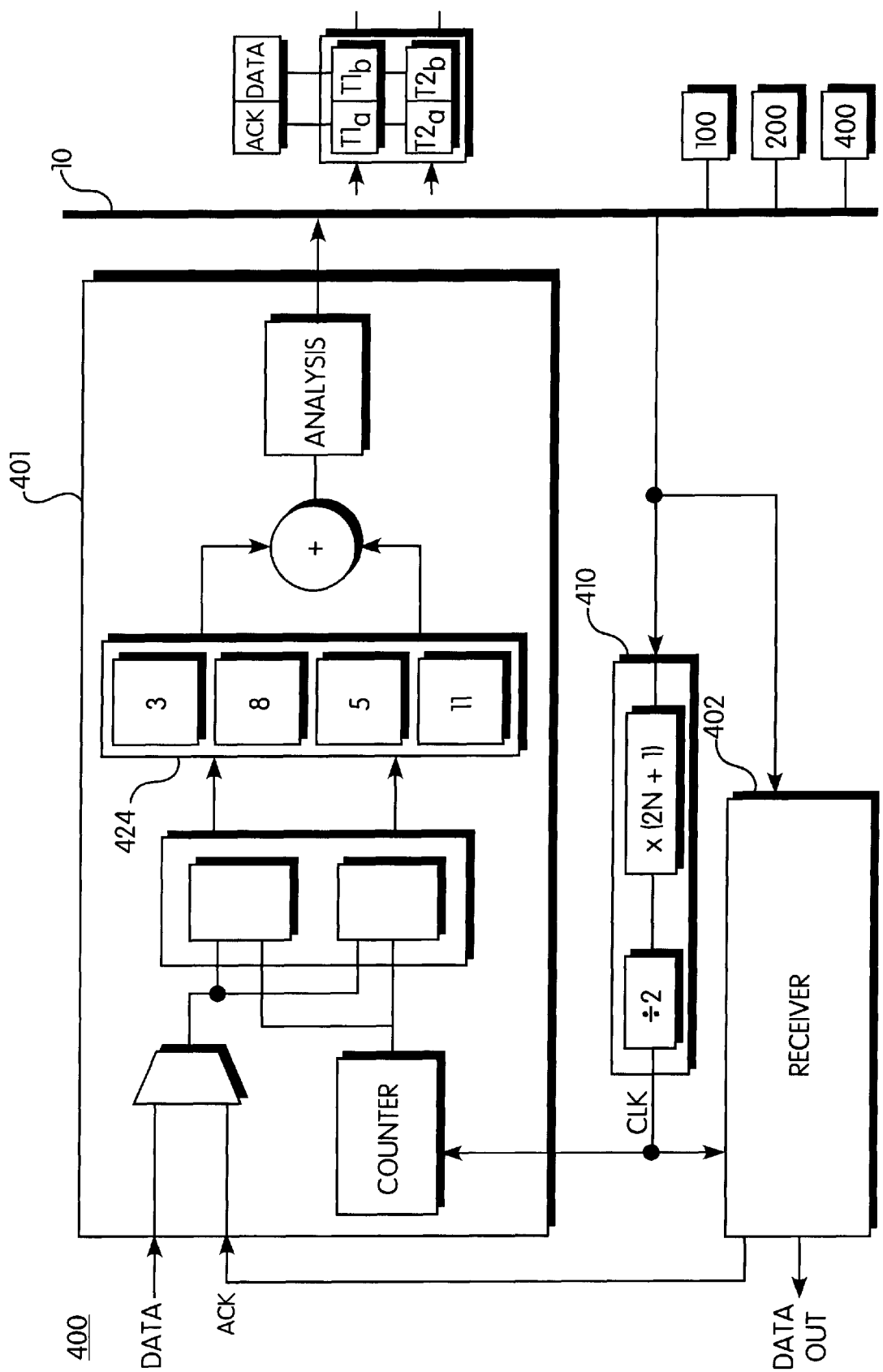
FIG. 11 is a block diagram of an exemplary embodiment of a bidirectional data communication device in accordance with the present invention.

FIG. 11 shows an exemplary embodiment of a communications device 400 that is capable of transmitting and receiving data in accordance with the present invention. As shown in FIG. 11, the transceiving device 400 comprises a transmitting part 401, a receiving part 402 and a clock generating circuit 410. The transmitting part 401 is implemented in accordance with the principles described above in connection with the exemplary transmitting device 100, whereas the receiving part 402 is implemented as described above in connection with the exemplary receiving device 200. The clock generating circuit generates a clock signal (e.g., 120,030 Hz), as described above, that is used by both the transmitting and receiving parts 401, 402.

In this example, data is communicated using a two-tone, DPSK scheme. As mentioned above, the receiving device transmits an acknowledgement message upon properly detecting a received symbol of user data. In an exemplary embodiment, the acknowledgement message is transmitted over a different channel (the "reverse channel") than the user data (the "forward channel"). For full bidirectional communication between two transceiving devices 400, each transceiving device is capable of transmitting and receiving signals on both the forward and reverse channels.

In accordance with an exemplary embodiment of the present invention, the implementation of the separate forward and reverse channels can be accomplished by using a first pair of tones for the forward channel and a second pair of tones for the reverse channel. Thus, for example, the first pair of tones consists of a first sinusoid spanning 8 cycles in a frame and a second sinusoid spanning 11 cycles in a frame whereas the second pair of tones consists of a first sinusoid spanning 3 cycles in a frame and a second sinusoid spanning 5 cycles in a frame. In this embodiment, therefore, the transmitter 401 is capable of generating two different pairs of tones depending on whether it is transmitting user data or an acknowledgement signal. The transmitter 401 thus includes a storage device 424 which includes four look-up tables, each containing waveform sample values for one of the four tones. If user data is being transmitted, a first pair of tables is used to generate the two tones. If an acknowledgement or other reverse channel message is transmitted, a second pair of look-up tables is used. As can be understood by a person of ordinary skill in the art, a variety of arrangements for storing and retrieving the waveform sample points can be used.

It should be noted that other modulation schemes may be used within the scope of the present invention. For example, frequency shift keying (FSK) can be used instead of DPSK or more than two tones can be used (e.g., 32 tones) with each tone conveying information in its frequency, phase or amplitude or some combination of these. Moreover, the number of bits per symbol can be increased by using other modulation schemes such as amplitude modulation in combination with the DPSK and/or increasing the number of possible phase values. Furthermore, the transmitter and receiver can begin their communications with a default modulation and encoding scheme (e.g., DPSK with 1 bit/symbol, as described) and agree to increase their data rate by switching to another modulation and/or encoding scheme allowing more bits of data per symbol. The devices can modify the default scheme during an initial handshake procedure. Alternately, the receiving device can inform the transmitting device of its capabilities based on the tones it uses on the reverse channel to echo the received data back to the transmitting device.

The transmitting and receiving devices of the present invention can also be used in a broadcast mode in which the transmitting device is sending data to more than one receiving device. In this case, the transmitting device can send multiple frames of each data symbol such that the receiver with the worst case conditions is likely to successfully decode the data. If after such a transmission one or more receiving devices did not properly decode the data, each of those devices can request, via the reverse channel, point-to-point communication, as described above, with the transmitting device. In a further embodiment, each transceiver can gauge the condition of the power line by listening for noise with its receiver. The transmitter section of the transceiver can then slow down its overall data rate or extend the time of individual symbols accordingly to increase the probability that the worst case receiving device will receive the transmission.

The data communication methods and systems of the present invention are also preferably downward compatible with pre-existing PLC standards such as X-10. For example, with X-10, a bit is represented by the presence or lack of a sinusoid burst. Such a signal can be generated and detected by the above-described transmitting and receiving devices of the present invention.

Other waveforms beside the example two tone scheme may be generated to encode the symbols and data. For example, a chirp signal such as that used by CEBus devices might be generated and, in accordance with the present invention, repeated continuously until the receiver detects it satisfactorily and sends an acknowledgement by some means. This would not be CEBus compliant, but would have some of the advantages of a chirp signal. The coherent sampling and frame averaging of the current invention would provide the same improvements over a fixed data rate, non-coherent scheme, namely the ability to operate at higher noise and attenuation levels.

In addition to communications between appliances within a household, the systems and methods of the present invention are also applicable to a wide array of applications such as remote meter reading, intercoms, security systems and shipboard communications.

What is claimed is:

1. A method of transmitting data comprising the steps of:
   generating a first tone;
   generating second tone;
   combining the first and second tones; and
   transmitting the combined tones,
   wherein:
      a phase of the first and second tones varies with the data to be transmitted, and
      the first and second tones are generated synchronously with an external reference frequency.

2. The method of claim 1, wherein the combined tones are transmitted over power lines and the external reference frequency is a frequency of an alternating current conducted by the power lines.

3. The method of claim 1, wherein the combined tones are retransmitted until an indication is received that the combined tones have been decoded.

4. The method of claim 1, wherein the first tone comprises a first integral number of cycles and the second tone comprises a second integral number of cycles.

5. A method of receiving data comprising the steps of:
   receiving a modulated data signal;
   sampling the modulated data signal synchronously with an external reference frequency;
   buffering a predetermined number of samples, each sample corresponding to a time slot;
   averaging successive samples corresponding to the same time slot; and
   analyzing the averaged samples for each time slot in order to decode the data.

6. The method of claim 5, wherein the analyzing step includes performing a frequency transformation to generate a magnitude parameter and a phase parameter of the received data signal.

7. The method of claim 6, wherein the phase parameter is indicative of the received data.

8. A method of communicating data over a transmission medium, the data being organized into data symbols and having a data rate, the method comprising:
   adjusting the data rate for each symbol in accordance with a condition of the transmission medium.

9. The method of claim 8, comprising:
   transmitting data symbols synchronously with an external reference frequency; and
   detecting the data symbols synchronously with the external reference frequency.

10. The method of claim 9, wherein the external reference frequency is a fundamental power line frequency.

* * * * *